Jan. 30, 1968   L. F. BARROERO   3,365,907
UPRIGHT REFRIGERATED CABINET WITH 360° UNIMPEDED ACCESS
Filed July 5, 1966   6 Sheets-Sheet 2
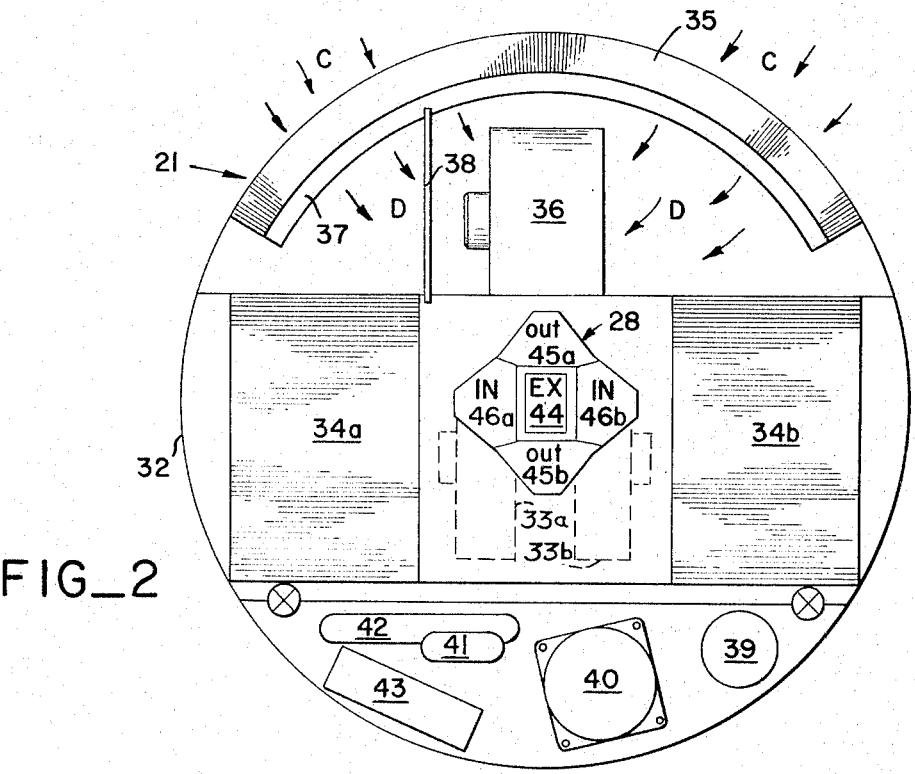
FIG_2
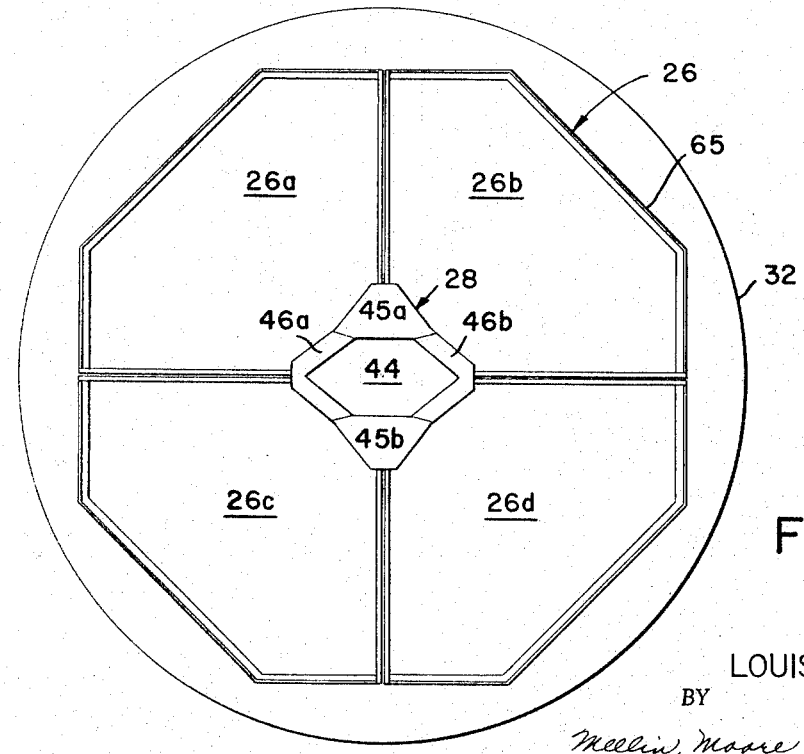
FIG_3
INVENTOR.
LOUIS F. BARROERO
BY
Mellin, Moore + Weisenberger
ATTORNEYS Jan. 30, 1968  L. F. BARROERO  3,365,907
UPRIGHT REFRIGERATED CABINET WITH 360° UNIMPEDED ACCESS
Filed July 5, 1966  6 Sheets-Sheet 3
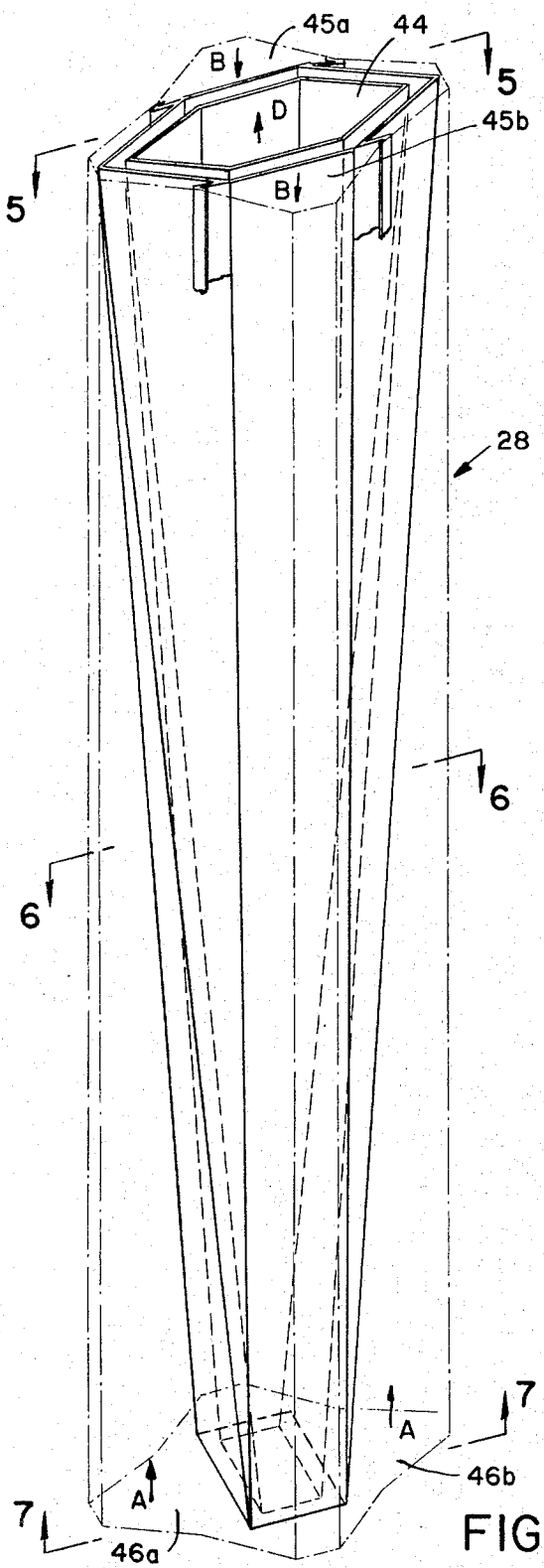
FIG_4
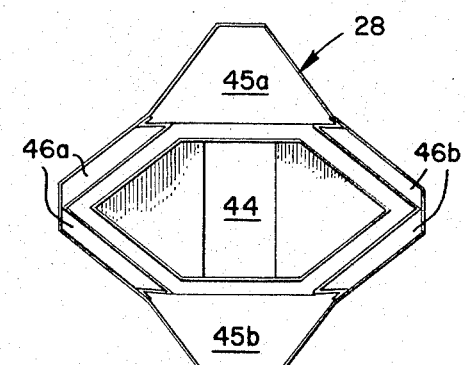
FIG_5
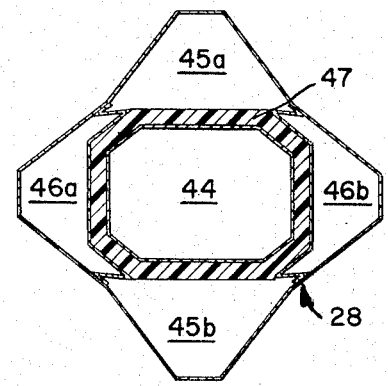
FIG_6
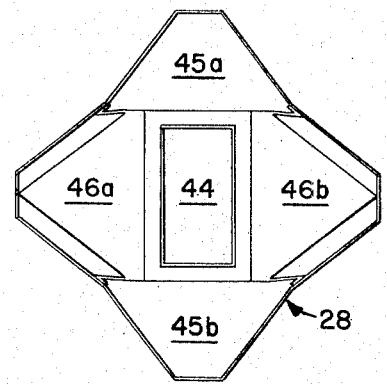
FIG_7
INVENTOR.
LOUIS F. BARROERO
BY
Mellin, Moore & Weisenberger
ATTORNEYS Jan. 30, 1968    L. F. BARROERO    3,365,907
UPRIGHT REFRIGERATED CABINET WITH 360° UNIMPEDED ACCESS
Filed July 5, 1966    6 Sheets-Sheet 4
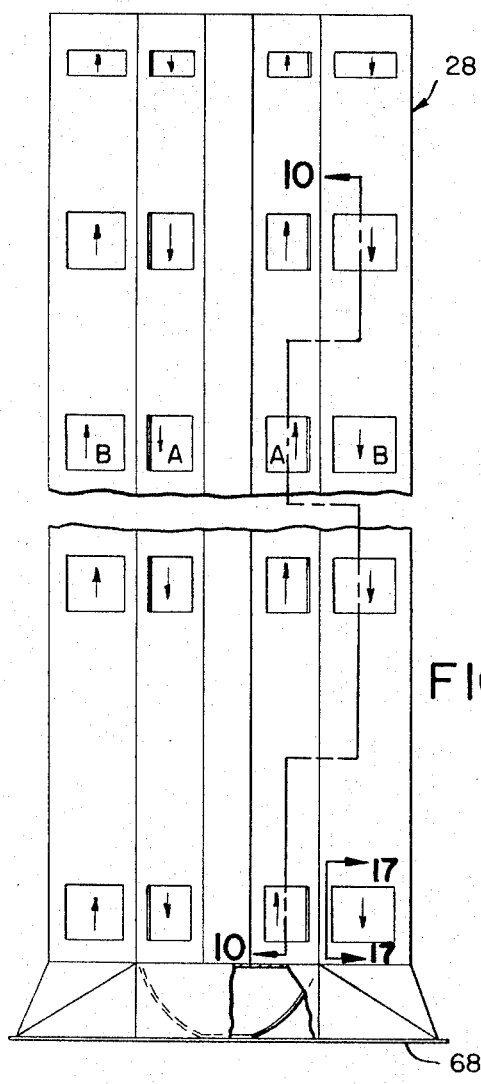
FIG_8
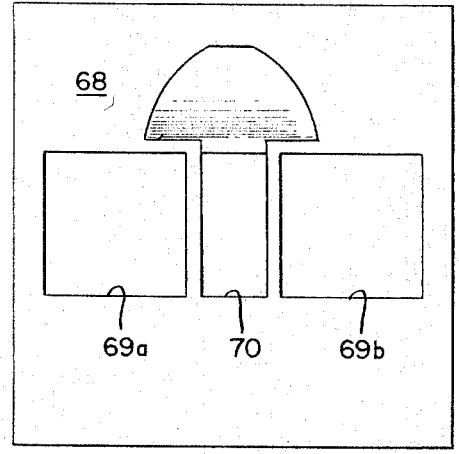
FIG_9
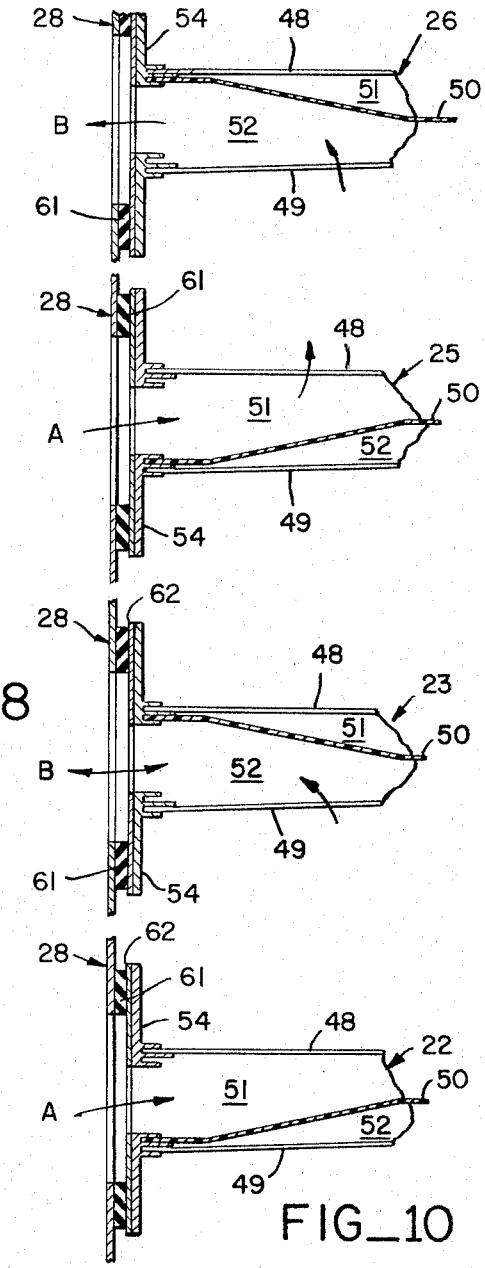
FIG_10
INVENTOR.
LOUIS F. BARROERO
BY
Mellin, Moore & Weissenberger
ATTORNEYS

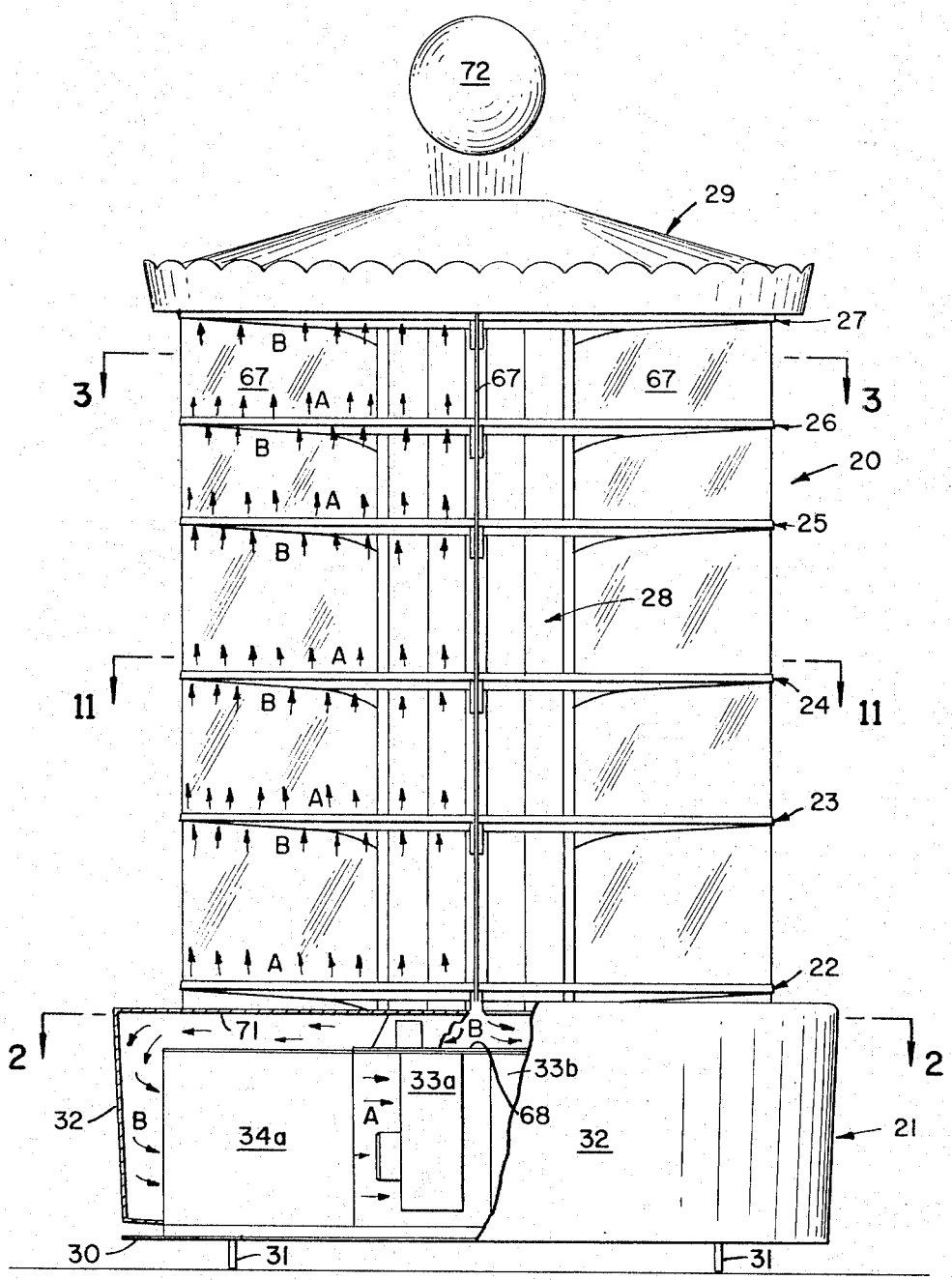
FIG_1

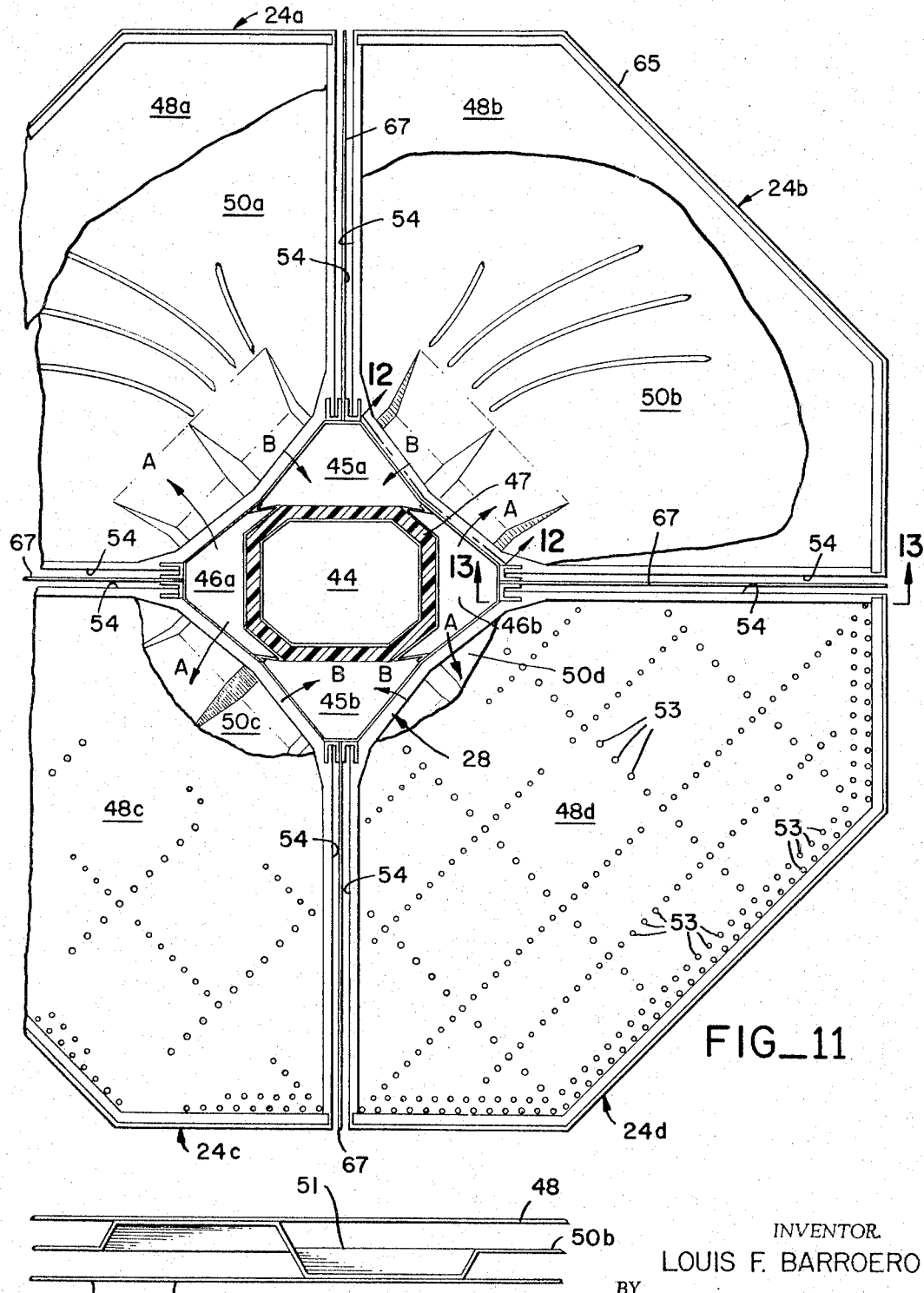

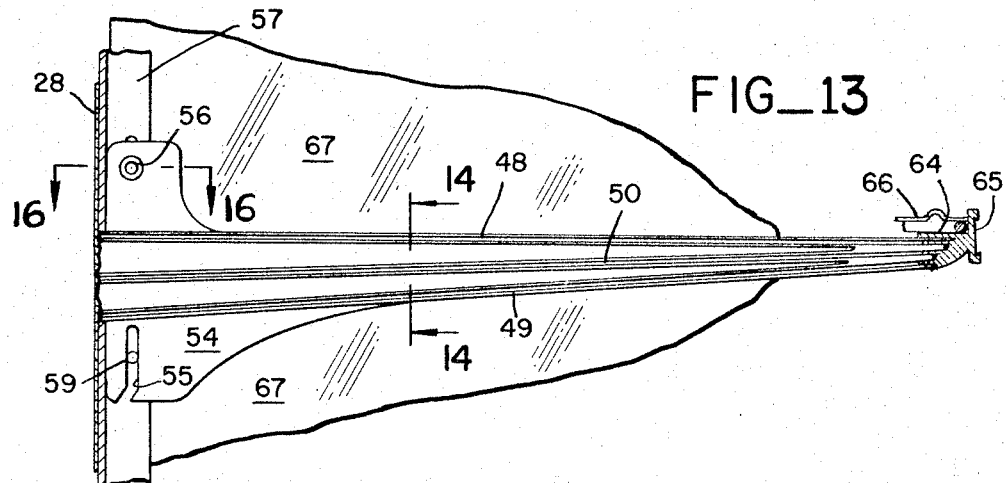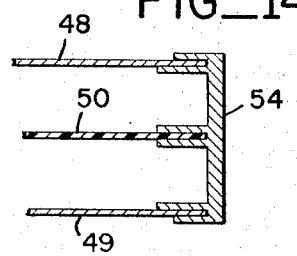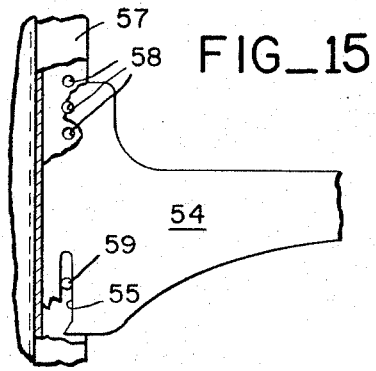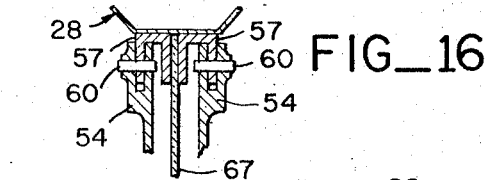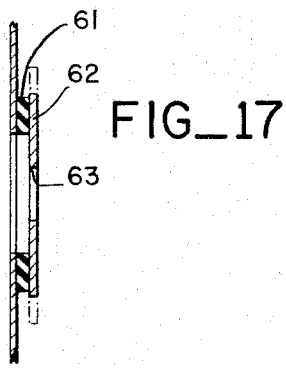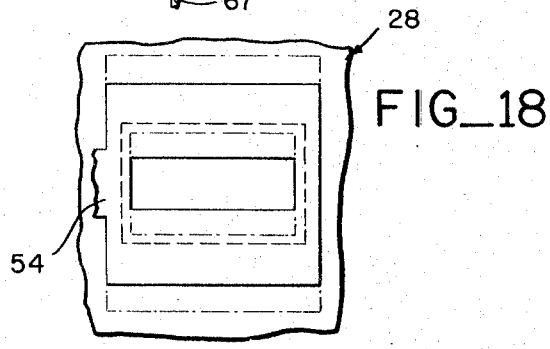

United States Patent Office 3,365,907
Patented Jan. 30, 1968

3,365,907
UPRIGHT REFRIGERATED CABINET WITH
360° UNIMPEDED ACCESS
Louis F. Barroero, 1585 Daniels Drive,
San Leandro, Calif. 94577
Filed July 5, 1966, Ser. No. 562,744
9 Claims. (Cl. 62—256)

ABSTRACT OF THE DISCLOSURE

A refrigerated shelf structure which includes an interior passageway and a plurality of exterior passageways all within a central duct, and a number of horizontal shelves mounted about the central duct, the shelves having upper and lower perforated surfaces and a divider therebetween to define upper and lower shelf cavities, the upper shelf cavities communicating with one of the exterior passageways, the lower shelf members communicating with another of the exterior passageways, and means for withdrawing air from one of the exterior passageways, means for cooling the air, and means for forcing the cool air into another of the exterior passageways.

---

This invention relates to an upright refrigerated shelf structure having 360° unimpeded access. It is particularly useful in providing an island or "carousel" refrigerated display cabinet in a retail store for items such as dairy products, beverages, juices, and other refrigerated goods. The present invention provides for 360° shelf exposure, and unimpeded access in the sense that there is no door or other barrier enclosing the goods in the display case and separating them from the consumer.

Refrigerated shelf structure of the prior art has been limited to structure having 180° exposure and access. Such structure is shown in my prior patents, No. 2,962,875, entitled, "Upright Refrigerated Cabinet With Unimpeded Front Access," and No. 3,090,211, entitled, "Refrigerating Shelf Structure."

While the shelf structure shown in the above patents is satisfactory for use adjacent a wall, it is not suitable for use as a display island or "carousel" because exposure and access is limited to 180°, the back of the structure having no exposure or access.

In refrigerated display cabinets of the class shown in the two prior patents (in which no barrier in the form of a door is provided to enclose the goods in the cabinet), maintaining the goods at a constant and reasonably cold temperature such as 35°–40° is especially difficult. The difficulty is even greater in the case of 360° refrigerated shelf structure such as described herein where cross currents at ambient temperature invade the boundary of the refrigerated display cabinet. Ambient temperature cross currents are minimized to some extent in a 180° access cabinet because the rear wall provides a barrier. With 360° access, as in the present invention, on the other hand, cross currents are less inhibited.

Accordingly, it is an object of the present invention to provide refrigerated shelf structure having 360° exposure and unimpeded access to the refrigerated goods.

It is a further object to provide refrigerated shelf structure as described above in which cross currents at ambient temperature are minimized by means of cold air circulation in the shelf structure.

It is a further object to provide refrigerated shelf structure having 360° unimpeded exposure and access in which the cooling and circulating elements are disposed compactly beneath the refrigerated shelf structure to provide a self-contained structure.

It is a further object to provide refrigerated shelf structure with 360° unimpeded exposure and access in which the shelves may be adjusted upwardly and downwardly to accommodate goods of varying heights.

Each of the above objects is fulfilled in the specific embodiment shown in the drawings, wherein:

FIG. 1 is a side view of the refrigerated shelf structure and shows the central duct, the shelves, and the refrigeration unit;

FIG. 2 is a sectional view taken on the line 2—2 of FIG. 1 and shows the refrigeration unit as well as the central duct;

FIG. 3 is a sectional view taken on the line 3—3 of FIG. 1 and shows the central duct with the four shelf quadrants mounted thereto;

FIG. 4 is a perspective view of the central duct. The outer wall of the duct is shown in phantom while the inner wall is shown in solid lines for clarity. Also for clarity, the perspective view of FIG. 4 fails to show the insulation placed between the inner walls of the central duct.

FIG. 5 is a top view of the central duct taken on line 5—5 of FIG. 4;

FIG. 6 is a sectional view of the central duct taken on line 6—6 of FIG. 4;

FIG. 7 is a bottom view of the central duct taken on line 7—7 of FIG. 4;

FIG. 8 is a side view of the central duct and shows the openings in the outer wall for communication between the exterior passage defined by the outer wall, and the hollow shelves;

FIG. 9 is a bottom view of the central duct shown in FIG. 8;

FIG. 10 is an enlarged partial sectional view of the shelf structure taken on line 10—10 of FIG. 8;

FIG. 11 is an enlarged sectional view taken on the line 11—11 of FIG. 1 and shows the central duct and four shelf quadrants (with two broken away) with the upper supporting shelf surface broken away to show the divider which separates each shelf into an upper shelf cavity and a lower shelf cavity;

FIG. 12 is a sectional view taken on the line 12—12 of FIG. 11 and shows the shelf divider;

FIG. 13 is a sectional view taken on the line 13—13 of FIG. 11 and shows the shelf bracket;

FIG. 14 is a sectional view taken on the line 14—14 of FIG. 13 and shows the shelf bracket and its relationship with the upper shelf surface, the shelf divider, and the lower shelf surface;

FIG. 15 is a fragmentary view of the shelf bracket and shows its vertically adjustable mounting to the central duct;

FIG. 16 is a sectional view taken on the line 16—16 of FIG. 13 and shows the pin mounting of the shelf brackets to the central duct;

FIG. 17 is a sectional view taken on the line 17—17 of FIG. 8 and shows the opening between an exterior passage in the central duct which communicates with a refrigerated shelf. The view shows a baffle plate and shows the varying positions of the baffle plate as the shelf is adjusted upwardly and downwardly to accommodate products of varying heights;

FIG. 18 is a frontal view of the baffle plate shown in FIG. 17 and the varying positions are shown in phantom.

General description and operation

The invention 20 may be generally understood with reference to FIG. 1. It includes a refrigerating unit 21, shelves 22–27 attached to central duct 28, and a top 29. Refrigerating unit 21 is mounted to base 30 which is supported by legs 31. A housing or shroud 32 encloses refrigerating unit 21.

Central duct 28 defines a longitudinally extending interior passageway (described in detail below) and four longitudinally extending exterior passageways (also described in detail below). Shelves 22–27 are vertically spaced and horizontally disposed circumferentially about central duct 28. Each of the shelves 22–26 has an upper perforated support surface. Each of the shelves 23–27 has a lower perforated surface and shelves 23–26 each contain a horizontally disposed divider disposed between the upper and lower surfaces, to thereby define an upper shelf cavity and a lower shelf cavity.

Each of the shelves 22–27 consists of four quadrants. The upper shelf cavity of each quadrant communicates with one of two diametrically opposed exterior passageways in central duct 28. The lower shelf cavity of each quadrant communicates with one of the other two diametrically opposed exterior passageways of central duct 28.

Air is withdrawn from one pair of diametrically opposed passageways by means of blowers 33a and 33b and the withdrawn air is cooled as it passes over coils 34a and 34b. The cooled air is then forced upwardly by blowers 33a and 33b through the other pair of diametrically opposed passageways in central duct 28.

Thus, air taken from the area beneath each of the shelves 23–27, as shown at arrows A (FIG. 1), passes through the lower perforated surface of each of the shelves, enters the lower shelf cavity in the case of shelves 23–26 (shelves 22 and 27 do not necessarily have an upper and lower cavity), passes downwardly through one pair of diametrically opposed exterior passageways in central duct 28, then passes over and through coils 34a and 34b and is cooled. The cooled air, B, is forced upwardly through the other pair of diametrically opposed exterior passageways of central duct 28 into shelf 22 and the upper shelf cavity of each of the shelves 23–26 and finally through the perforated support surface of each of the shelves 22–26.

Cool air is thus circulated upwardly between shelves to thereby pass through and over goods supported thereon to accomplish the refrigeration.

With the foregoing general description of the present invention and its operation, the following detailed description may be conveniently understood.

*Detailed description and operation*

The refrigerating unit 21 is shown in FIG. 2. It includes a shroud or housing 32, a pair of circulating blowers 33a and 33b, and a pair of coils 34a and 34b. A condenser 35 extends circumferentially of shroud 32 an angular distance of about 120°. Condenser blower 36 draws air, C, at ambient temperature through and over condenser 35 to serve to cool and condense the coolant in the refrigerating system. A drain trough 37 is provided beneath condenser 35 and drain line 38 extends from a catch basin beneath coils 34 to drain trough 37. The coolant is circulated through receiver 39, compressor 40, filter dryer 41 and heat exchanger 42, as well as through coils 34 and condenser 35. Typical electrical controls are mounted in control box 43.

Condenser blower 36 draws air, C, at ambient temperature through condenser 35 where it is heated as the coolant condenses. The hot air, D, is exhausted upwardly through the interior exhaust passage 44 of central duct 28.

Circulating blowers 33a and 33b withdraw air, B, downwardly through diametrically opposed exterior passageways 45a and 45b, respectively. The withdrawn air is passed over coils 34a and 34b and passes through blowers 33a and 33b. Blowers 33a and 33b force the cool air, A, upwardly through diametrically opposed exterior passageways 46a and 46b, respectively. How the air is circulated through shelves 22–27 and cools the goods is described in greater detail below.

As may be seen in FIG. 3, each of the shelves consists of four shelf quadrants. Shelf quadrants 26a, 26b, 26c, and 26d make up shelf 26 and they are circumferentially disposed about central duct 28. Shelf quadrant 26a communicates with exterior passageways 45a and 46a. Shelf quadrant 26b communicates with exterior passageways 45a and 46b. Shelf quadrant 26c communicates with exterior passageways 46a and 45b. And quadrant 26d communicates with exterior passageways 45b and 46b. The detailed nature of the relationship between each of the shelf quadrants and the central duct 28 will be described below.

The central duct 28 appears in FIGS. 4–7 and defines an interior passageway 44, a pair of diametrically opposed exterior passageways 45a and 45b, and a pair of diametrically opposed exterior passageways 46a and 46b. Thermal insulating material 47 is placed the length of central duct 28 to separate the interior passageway 44 from the exterior passageways 45a, 45b, 46a and 46b.

As may be seen from FIGS. 4–7, the cross-section of central duct 28 varies. Only the cross-section of exterior passageways 45a and 45b remains constant throughout the length of duct 28. Interior passageway 44 is rectangular at the lower end of central duct 28 (see FIGS. 4 and 7) and diverges to a polygonal cross-section at the upper end (see FIGS. 4 and 5).

FIG. 4 is shown without the thermal insulation 47 and with the exterior edges of central duct 28 in phantom for clarity. Also for clarity, in showing the construction of central duct 28, the exterior surfaces are shown without the openings which allow communication from exterior passageways 45a and 45b and 46a and 46b to the shelves.

The structure of shelves 22–27 may be best understood with reference to FIGS. 10–13. As may be seen in FIG. 11, each of the shelves consists of four shelf quadrants which are individually mounted to central duct 28 and are shown at 24a, 24b, 24c and 24d. Each quadrant includes an upper perforated support surface 48, a lower perforated surface 49 and a divider 50 which together define an upper shelf cavity 51 and a lower shelf cavity 52.

The upper support surface 48 of each of the shelf quadrants defines perforations 53 which are preferably spaced as shown in FIG. 11 with a preponderance of perforations along the periphery of each shelf. The lower surface 49 of each shelf quadrant is also perforated in a pattern similar to that shown in FIG. 11, although the perforations are not shown in the drawings.

With reference primarily to FIGS. 13–16, each shelf quadrant includes a pair of shelf brackets 54 which provide a means for mounting upper perforated support surface 48, lower perforated surface 49 and divider 50. Each bracket 54 defines a vertically extending slot 55 and a pin aperture 56. A shelf mounting bracket 57 extends the length of central duct 28 to serve as a mating member for shelf brackets 54. Vertically extending duct bracket 57 is provided with spaced groups of pin apertures 58 and a pin 59 is provided in association with each group of pin apertures 58. Thus, the shelf quadrants may be mounted to central duct 28 in one of three positions to thereby provide for vertical adjustment of the shelves. Shelf brackets 54 are mounted to duct brackets 57 with slots 55 in engagement with pin 59 and with pin 60 in engagement with pin aperture 56 of shelf bracket 54 and the selected pin aperture 58 of duct bracket 57.

The configuration of shelf divider 50b may be seen with reference to FIGS. 10, 11 and 12. Divider 50b, as best seen in FIG. 12, has an offset inlet and outlet area to conduct cool air coming into shelf quadrant 24b (from exterior passageway 46b) into upper shelf cavity 51 and to insure that air withdrawn from shelf quadrant 24b (into exterior passageway 45a) is withdrawn from lower shelf cavity 52. The dividers in each of the other shelf quadrants have similarly offset inlet and outlet areas to conduct incoming cool air from exterior passageways 46a and 46b into upper shelf cavities 51 and to insure withdrawal of spent or warm air from the lower shelf cavity into exterior passageways 45a and 45b as shown by arrows A and B, respectively.

As best seen in FIGS. 10 and 17, a gasket 61 is placed between central duct 28 and shelf bracket 57 to insure a hermetically sound joint between central duct 28 and each shelf quadrant.

A baffle plate 62 having an opening 63 may be interposed between gasket 61 and shelf bracket 54 to provide a means of adjusting the opening in central duct 28 between the exterior passageways 45 and 46 and the upper and lower shelf cavities 51 and 52. Thus, the volume of air introduced into each shelf quadrant can be controlled and, by adjusting the position of baffle plate 62 upwardly and downwardly, the air supply to any shelf quadrant may be completely cut off.

As best seen in FIG. 13, each shelf quadrant has an outer edge member 64 which serves as a mounting for upper perforated support surface 48, lower perforated surface 49, and divider 50 at their outer extremity between the diverged brackets 54. Edge member 64 includes a slot 65 which serves as a mounting for price tags and other informative matter relating to the refrigerated goods displayed.

A wire rack 66 is placed on top of each shelf quadrant to insure a spacing between upper perforated support surface 48 and the goods supported and displayed thereon.

As best seen in FIGS. 1, 11 and 13, four vertically disposed transparent sheets 67 are placed between the shelf quadrants to minimize cross currents of ambient air between shelves 22-27.

As shown in FIGS. 8 and 9, a plate 68 defining circulating blower apertures 69a and 69b and exhaust blower aperture 70 is secured to the lower flared portion of central duct 28. The outlet or exhaust of circulating blowers 33a and 33b communicates with apertures 69a and 69b, respectively. By means of appropriate sheeting apertures 69a and 69b communicate with exterior passageways 46a and 46b, respectively. The outlet or exhaust of condenser blower 36 communicates with exhaust aperture 70 which, by appropriate sheeting communicates with interior or exhaust passageway 44. By appropriate sheeting exterior passageways 45a and 45b communicate with the area above coils 33a and 33b, respectively. Plate 71 above coils 34a and 34b in combination with housing 32 insures that the intake of blowers 33a and 33b draws air from exterior passageways 45a and 45b, respectively, through coils 33a and 33b, respectively.

While forming no part of the present invention, a ball 72 may be suspended in the stream of exhaust air, D, as shown in FIG. 1.

It should be noted that exterior passageways 46a and 46b, which conduct cold air upwardly, are tapered. Thus the pressure of the cold air is reasonably constant throughout the length of central duct 28 in spite of the series of outlets communicating with the various shelves. The tapered design results in a uniform delivery of cool air to all the shelves even though the higher shelves are located a greater distance from the source of cold air than the lower shelves.

The operation of the apparatus described may be best understood with reference to arrows A–D which appear in the various views. Arrows A represent cool circulating air that has been cooled by passing over coils 34. Cool air, A, is conditioned to pass over the goods to accomplish refrigeration. Arrows B represent spent or warm circulating air, or stated another way, air that has passed over the goods and increased in temperature as compared to the cool circulating air, A. Arrows C represent ambient air. Arrows D represent heated or exhaust air that has passed through condenser 35. Exhaust air, D, is exhausted upwardly through interior passageway 44.

Goods are placed on shelves 22–26. Coolant is circulated through the refrigerating system shown in FIG. 2. Circulating blowers 33a and 33b force cool air, A, upwardly through exterior passageways 46a and 46b into the upper shelf cavity 51 of each shelf quadrant. The cool air leaves upper shelf cavity 51 through perforations 53 and passes over the goods. The air is heated and the goods cooled. The spent air, B, is drawn into the perforations (not shown) in the lower perforated surface of each shelf quadrant and into lower shelf cavity 52. Circulating blowers 33 draw the spent air, B, downwardly through exterior passageways 45a and 45b, over and through coils 34a and 34b, where the air is cooled and emerges as cool air, A, to be recirculated.

The refrigerant or coolant is heated and vaporized in coils 34a and 34b as the circulating air is cooled. Exhaust blower 36 draws ambient air, C, through condenser 35 through which the vaporized refrigerant is circulated, cooled and condensed. As the refrigerant condenses it releases heat to ambient air, C, which is heated to become exhaust air, D, which is forced by blower 36 upwardly through interior passageway 44 out of the system.

I claim:
1. Refrigerated shelf structure which comprises:
   (a) a central duct defining a longitudinally extending interior passageway and a plurality of longitudinally extending exterior passageways;
   (b) a plurality of vertically-spaced, horizontal shelves mounted to and disposed circumferentially about said central duct, said shelves having an upper perforated support surface, a lower perforated surface and a horizontally disposed divider between said upper and lower surfaces, to thereby define an upper and lower shelf cavity;
   (c) said upper shelf cavities communicating with one of said exterior passageways;
   (d) said lower shelf cavities communicating with another of said exterior passageways;
   (e) means for withdrawing air from one of said exterior passageways;
   (f) means for cooling said air; and
   (g) means for forcing said cool air into another of said exterior passageways.

2. The shelf structure of claim 1 and means for exhausting warm air upwardly through said interior passage.

3. The shelf structure of claim 2 and thermal insulation disposed in said central duct between said interior passage and said exterior passages.

4. The shelf structure of claim 2 wherein said means for forcing cool air into said passageway communicates with said passageway at the bottom thereof and said passageway has a decreasing cross-section from bottom to top.

5. Refrigerated shelf structure which comprises:
   (a) a vertically disposed central duct defining a vertically extending interior passageway and four vertically extending exterior passageways, said exterior passageways being disposed about said interior passageway adjacent one another;
   (b) a plurality of vertically-spaced, horizontal shelves mounted to and disposed circumferentially about said central duct, said shelves having an upper perforated support surface, a lower perforated surface and a horizontally disposed divider between said upper and lower surfaces, to thereby define an upper and lower shelf cavity;
   (c) said upper shelf cavities communicating with a first pair of diametrically opposed exterior passageways;
   (d) said lower shelf cavities communicating with a second pair of diametrically opposed exterior passageways;
   (e) means for withdrawing air from said second pair of exterior passageways;
   (f) means for cooling said air; and
   (g) means for forcing said cool air into said first pair of exterior passageways.

6. The shelf structure of claim 5 and means for exhausting warm air upwardly through said interior passage.

7. The shelf structure of claim 6 and terminal insulation disposed in said central duct between said interior passage and said exterior passages.

8. The shelf structure of claim 6 wherein said means for forcing said cool air into said first pair of exterior passageways communicates with said first pair at the bottom thereof and said first pair of passageways has a decreasing cross-section from bottom to top.

9. The shelf structure of claim 5 wherein said shelves define quadrants, the upper shelf cavity of each of said quadrants communicating with one of said first pair of exterior passageways and the lower shelf cavity of each of said quadrants communicating with one of said second pair of exterior passageways.

References Cited

UNITED STATES PATENTS

| | | | |
|---|---|---|---|
| 986,875 | 3/1911 | Tilghman | 62—255 |
| 2,223,761 | 12/1940 | Hall | 62—256 |
| 2,986,019 | 5/1961 | Happer | 62—255 |
| 3,115,019 | 12/1963 | Rutishauser | 62—256 |
| 3,196,626 | 7/1965 | Gabler | 62—256 |

WILLIAM J. WYE, *Primary Examiner.*